United States Patent
Frecon

(10) Patent No.: US 8,135,108 B2
(45) Date of Patent: Mar. 13, 2012

(54) NUCLEAR POWER STATION COMPRISING AT LEAST ONE HIGH TEMPERATURE REACTOR

(75) Inventor: Christophe Frecon, Assieu (FR)

(73) Assignee: Areva NP, Courbevoie (FR)

( * ) Notice: Subject to any disclaimer, the term of this patent is extended or adjusted under 35 U.S.C. 154(b) by 442 days.

(21) Appl. No.: 12/330,026

(22) Filed: Dec. 8, 2008

(65) Prior Publication Data
US 2009/0213979 A1   Aug. 27, 2009

Related U.S. Application Data

(60) Provisional application No. 61/018,725, filed on Jan. 3, 2008.

(30) Foreign Application Priority Data

Dec. 11, 2007  (FR) ...................................... 07 59731

(51) Int. Cl.
*G21C 19/00*  (2006.01)

(52) U.S. Cl. ......................... 376/272; 376/267; 376/260

(58) Field of Classification Search .................. 376/267, 376/268, 272
See application file for complete search history.

(56) References Cited

U.S. PATENT DOCUMENTS

| 3,212,991 | A | * | 10/1965 | Brynsvold et al. | 376/434 |
| 3,575,803 | A | * | 4/1971 | Greebler | 376/172 |
| 3,746,616 | A | * | 7/1973 | Leitnaker | 376/421 |
| 4,069,766 | A | | 1/1978 | Bernstein | |
| 4,096,031 | A | * | 6/1978 | Wade | 376/270 |
| 4,167,442 | A | * | 9/1979 | Timofeev et al. | 376/271 |
| 4,866,286 | A | * | 9/1989 | Baatz et al. | 250/507.1 |
| 5,291,532 | A | * | 3/1994 | Townsend et al. | 376/269 |
| 6,885,718 | B1 | * | 4/2005 | Meintker | 376/268 |

FOREIGN PATENT DOCUMENTS

| GB | 953298 | 3/1964 |
| LU | 44889 | 1/1964 |

OTHER PUBLICATIONS

Planning Information Corporation, "The Transportation of Spent Nuclear Fuel and High-Level Radioactive Waste," Sep. 1996, http://www.state.nv.us/nucwaste/trans/1pic06.htm, accessed Jan. 1, 2011.*

* cited by examiner

*Primary Examiner* — Ricardo Palabrica
(74) *Attorney, Agent, or Firm* — Connolly Bove Lodge & Hutz LLP

(57) ABSTRACT

The invention relates to a nuclear power station comprising:
  at least one high temperature reactor;
  a storage installation (14) for fuel elements (5);
  means (32) for transferring the fuel elements (5) between the core (4) and the storage installation (14).
According to the invention, the transfer means (32) comprise a tunnel (34) for transferring the fuel elements between the reactor core (4) and the storage installation (14).

13 Claims, 5 Drawing Sheets

NUCLEAR POWER STATION COMPRISING AT LEAST ONE HIGH TEMPERATURE REACTOR

CROSS REFERENCE TO RELATED APPLICATIONS

This nonprovisional application claims priority under 35 U.S.C. §119(e) on U.S. Provisional Application No. 61/018,725 filed on Jan. 3, 2008 and under 35 U.S.C. §119(a) on U.S. Pat. No. 0,759,731 filed in France on Dec. 11, 2007, the entire contents of which are hereby incorporated by reference.

The present invention relates in general to nuclear power stations comprising at least one high temperature reactor.

More precisely, the invention relates, in accordance with a first aspect, to a nuclear power station of the type comprising:
- at least one high temperature reactor, comprising a core in which a plurality of fuel elements is arranged;
- a storage installation for fuel elements;
- means for transferring the fuel elements between the core and the storage installation.

Each reactor must be shut down periodically in order to replace a portion of the fuel elements with new elements and reorganise the remaining elements. The spent fuel elements are transferred from the core to the storage installation associated with the reactor. They are then transferred from the storage installation to a centralised storage installation, which may be situated in the nuclear power station or at another site. Conversely, the new fuel elements are transferred from a storage unit situated on the nuclear power station site, to the dedicated storage installation of the reactor, then, when the fuel elements are replaced, into the reactor core.

The transfer of fuel elements between the reactor and the storage installation dedicated to said reactor using a shielded transfer hood is known. The hood comprises a small barrel which may contain a plurality of fuel elements. It moves between the reactor and the storage installation by the main handling bridge of the nuclear power station. The transfer is performed by the sealed coupling of the hood to a removal aperture situated above the reactor core, then by transferring successively a plurality of fuel elements from the reactor core to the hood. Once the hood is full, the loading aperture of the hood is closed again, and the hood is moved to an unloading aperture situated in the upper biological protection slab of the storage installation. Next, the hood is coupled in a sealed manner to the aperture. The fuel elements are then unloaded from the hood. Once the unloading is finished, the hood is uncoupled, transported in the opposite direction to the reactor and coupled once more to the removal aperture in order to load other fuel elements. Transfers of new fuel elements are carried out with the hood, using a reverse procedure.

The operations for removing spent fuel elements from the core to the storage installation, then loading new fuel from the storage installation to the core, are very lengthy. In fact, the hood must be moved many times between the core and the storage installation. The hood must be coupled each time, either above the core or above the storage installation. Moreover, all the transfers are performed in an inert atmosphere, which requires many inert gas-producing operations. In addition, the hood is very heavy. In order to minimise the risk of falls, the hood must be moved very slowly.

In this context, the object of the invention is to propose a nuclear power station, in which the loading and unloading operations of the reactor core are faster.

Accordingly, the invention relates to a nuclear power station of the above-mentioned type, characterised in that the transfer means comprise:
- a tunnel, of which a first portion is situated near the core and a second portion is situated in or near the storage installation;
- first transfer means suitable for transferring at least one fuel element between the core and the first stretch;
- second transfer means suitable for transferring at least one fuel element between the second portion and the storage installation;
- means for transferring at least one fuel element along the tunnel between the first and second portions.

The nuclear power station may also have one or more of the following characteristics, considered individually or in all technically possible combinations:
- the first portion is situated above the core.
- the first transfer means comprise first connection means substantially sealed between the core and the first portion, the second transfer means comprise second connection means substantially sealed between the second portion and the storage installation, the tunnel forming a continuous sealed path with the first and second connection means for the fuel elements from the core to the storage installation.
- a first biological protection slab is situated above the reactor core, the tunnel being arranged at least in part beneath or in the first biological protection slab.
- the first biological protection slab comprises an aperture perpendicular to the core, the power station comprising a support stopper arranged removably in the aperture, the first portion of the tunnel being arranged in the support stopper.
- a second biological protection slab is situated above the storage installation, the second portion of the tunnel being situated at a lower elevation than that of the second biological protection slab.
- a first biological protection slab is situated above the reactor core, the tunnel being arranged at least in part above the first biological protection slab.
- the first biological protection slab comprises an aperture perpendicular to the core, the power station comprising a support stopper arranged removably in the aperture, the first portion of the tunnel being arranged above the support stopper.
- a second biological protection slab is situated above the storage installation, the second portion of the tunnel being situated above the second biological protection slab.
- the power station comprises:
- a plurality of high temperature reactors, each comprising a core in which a plurality of fuel elements is arranged;
- for each reactor, a dedicated fuel elements storage installation for said reactor;
- means for moving the tunnel between a plurality of service positions each corresponding to a reactor, the first portion of the tunnel being situated in each service position close to the core of the corresponding reactor and the second portion of the tunnel being situated in or near the storage installation dedicated to said reactor.
- The power station comprises:
- a plurality of high temperature reactors, each comprising a core in which a plurality of fuel elements is arranged;
- for each reactor, a fuel elements storage installation dedicated to said reactor;
- a plurality of connection tunnels connecting each two storage installations to each other, each connection tunnel comprising a first portion situated near one of the two corresponding storage installations and a second portion situated in or near the other of the two corresponding storage installations;

for each connection tunnel, first transfer means suitable for transferring at least one fuel element between the corresponding storage installation and the first portion;

for each connection tunnel, second transfer means suitable for transferring at least one fuel element between the second portion and the corresponding storage installation;

for each connection tunnel, means for transferring at least one fuel element along the connection tunnel between the first and second portions.

a biological protection slab is situated above each storage installation, the first and second portions of each connection tunnel being situated at elevations respectively lower than those of the biological protection slabs of the corresponding storage installations.

the storage installations are arranged in a line, each connection tunnel connecting two adjacent storage installations along the line.

According to a second aspect, the invention relates to a process for transferring fuel elements between a high temperature reactor and a fuel elements storage installation, in a nuclear power station having the above characteristics. According to the invention, the process comprises the following stages:

transferring at least one fuel element between the reactor core and the first portion of the tunnel;

transferring the or each fuel element along the tunnel between the first and second portions;

transferring the or each fuel element between the second portion and the storage installation.

According to a third aspect, the invention relates to a process for transferring fuel elements between two fuel element storage installations, in a nuclear power station having the above characteristics, the two storage installations being connected to each other by a connection tunnel comprising a first portion situated near one of the two storage installations and a second portion situated in or near the other of the two storage installations. According to the invention, the process comprises the following stages:

transferring at least one fuel element between said one of two storage installations and the first portion;

transferring the or each fuel element along the connection tunnel between the first and second portions;

transferring the or each fuel element between the second portion and said other of the two storage installations.

Other characteristics and advantages of the invention will emerge from the detailed description given below, as an indication only that is in no way limiting, with reference to the accompanying drawings in which.

Figure 1:
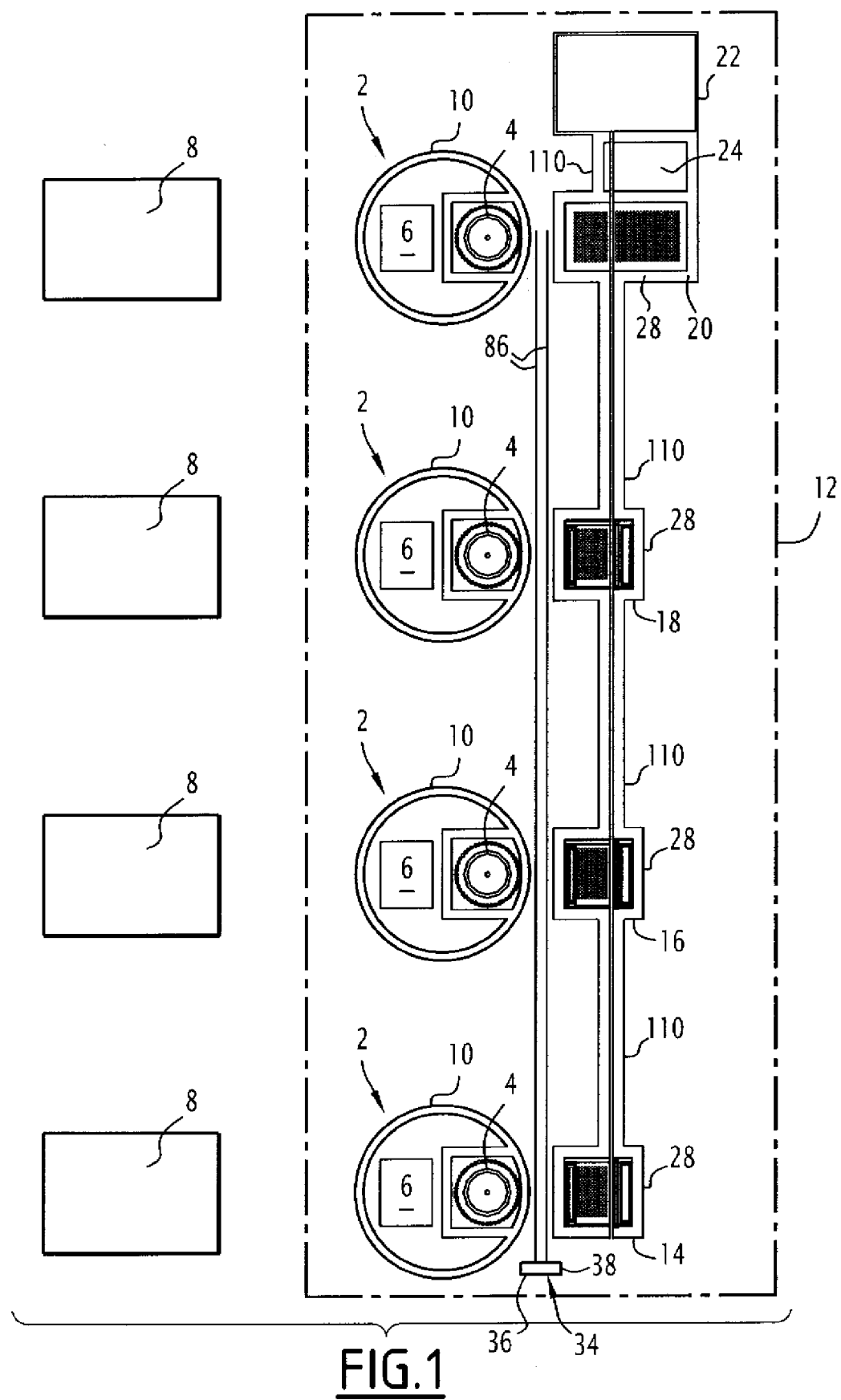
FIG. 1 is a schematic view of a nuclear power station according to the invention, viewed from above.

The nuclear power station shown schematically in FIG. 1 comprises four high pressure reactors 2. These four reactors are identical to each other. Each reactor 2 comprises a core 4, a principal heat exchanger 6, a primary conduit (not illustrated) for transferring the heat generated by the core 4 to the exchanger 6, an installation 8 for converting thermal energy into electricity and a secondary conduit (not illustrated) for transferring the heat from the exchanger 6 to the installation 8.

The core 4 comprises a plurality of fuel elements 5 of hexagonal cross-portion. Each fuel element is about 900 mm high, and has a cross-portion that lies within a circle with a diameter of about 450 mm. These fuel elements are of a known type and will not be described in more detail here.

The reactor operates at a temperature of between 750° C. and 1200° C., for example.

The primary conduit contains a gas, generally a mixture of helium and nitrogen. This gas is circulated in the primary conduit by one or more compressors and passes through the core heating up in contact with the fuel elements. It is then taken to the principal exchanger 6, where it transfers its heat to the fluid circulating in the secondary conduit. It is then recompressed and recycled to the core 4.

The secondary conduit too generally comprises a gas, for example helium or a gas mixture. This gas is circulated, heats up when passing through the exchanger 6, and is then taken to the conversion installation 8. This installation comprises for example one or more gas turbines, driving an alternator. The secondary gas drives the turbines, then is recompressed before being recirculated to the exchanger 6.

The nuclear island of each reactor, in other words the core 4, the principal exchanger 6 and the primary conduit, is assembled in the same civil engineering structure 10 represented by a circle in FIG. 1. The nuclear islands of the four reactors of the power station are assembled in the same reactor building 12, the outline of which is represented by a dot-and-dash line in FIG. 1.

Moreover, the power station comprises four nuclear fuel storage installations 14, 16, 18 and 20, each storage installation being associated with one of the nuclear reactors.

The installations 14, 16 and 18 have the same capacity. They each have a storage capacity of at least one sixth of the total number of fuel elements arranged normally in the reactor core, this capacity being less than said total number. Preferably, each installation 14, 16, 18 has a capacity of about one third of said total number.

The storage installation 20 has the largest capacity. It can receive all of the fuel elements for a core.

The nuclear power station also comprises a new fuel element storage installation 22, waiting to be transferred into the core of one of the reactors 2. This installation is common to the four reactors.

The power station also comprises a spent fuel element packing installation 24, for example in order to transport them outside the nuclear power station. The storage installations 14, 16, 18 and 20, the new fuel element storage installation 22, and the packing installation 24 are all arranged in the reactor building 12.

The four reactors are arranged in a straight line. Similarly, the four storage installations 14, 16, 18 and 20, the packing installation 24 and the new fuel element storage installation 22 are also situated in a straight line, in that order. The storage installations 14, 16, 18 and 20 are each arranged near a reactor 2.

Each nuclear island 10 is covered by a biological protection slab 26 (see for example FIGS. 3 and 5), which extends perpendicular to the reactor, to the principal exchanger 6 and to the primary conduit. The slabs 26 of the four reactors are of very thick concrete, and are situated substantially at the same elevation.

The storage installations 14, 16, 18 and 20 are all of the same type. They are delimited laterally by concrete walls 28, and they are covered by a biological protection slab 29. The slabs 29 are of very thick concrete, and are all substantially at the same elevation. They are also at the same elevation as the protection slabs 26 of the different reactors.

Figure 4:
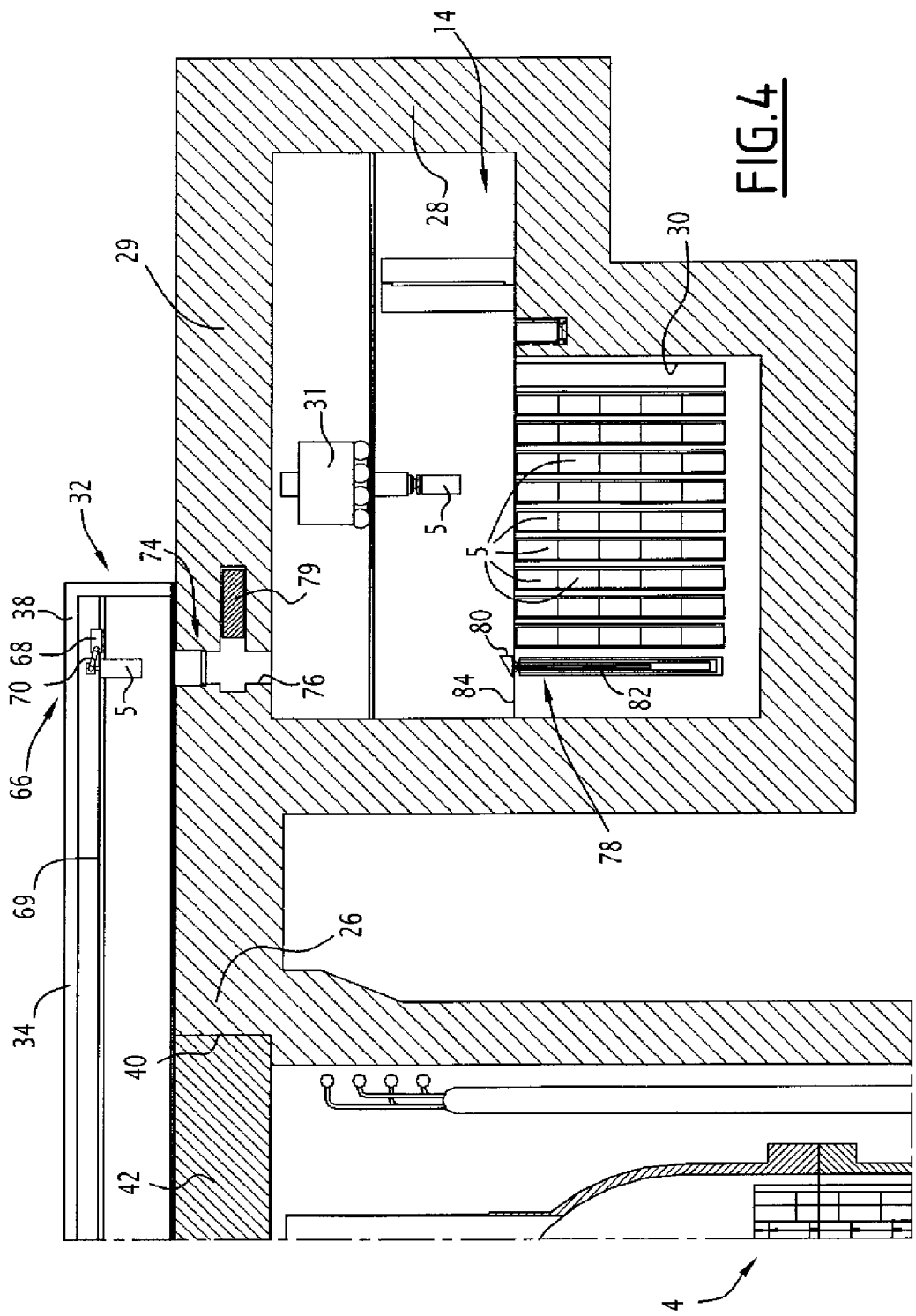
FIG. 4 is a view in vertical cross-portion of the storage installation of FIG. 2 and a portion of the tunnel.

As shown in FIG. 4, each storage installation comprises a plurality of pits 30 in which a plurality of fuel elements 5 may be stacked. The installation also comprises a rolling bridge 31 provided with means for handling the fuel elements.

The slabs 26 and 29 are joined up and form the floor of the principal hall of the nuclear power station. This hall covers the four reactors and the storage installations 14 to 20. It may be continuous or on the other hand be subdivided into four portions by internal dividing walls, each portion covering a reactor and the storage installation associated therewith.

According to a first aspect of the invention, the nuclear power station comprises for each reactor 2, means 32 for transferring fuel elements between the core 4 of the reactor and the corresponding storage installation 14 to 20.

Figure 2:
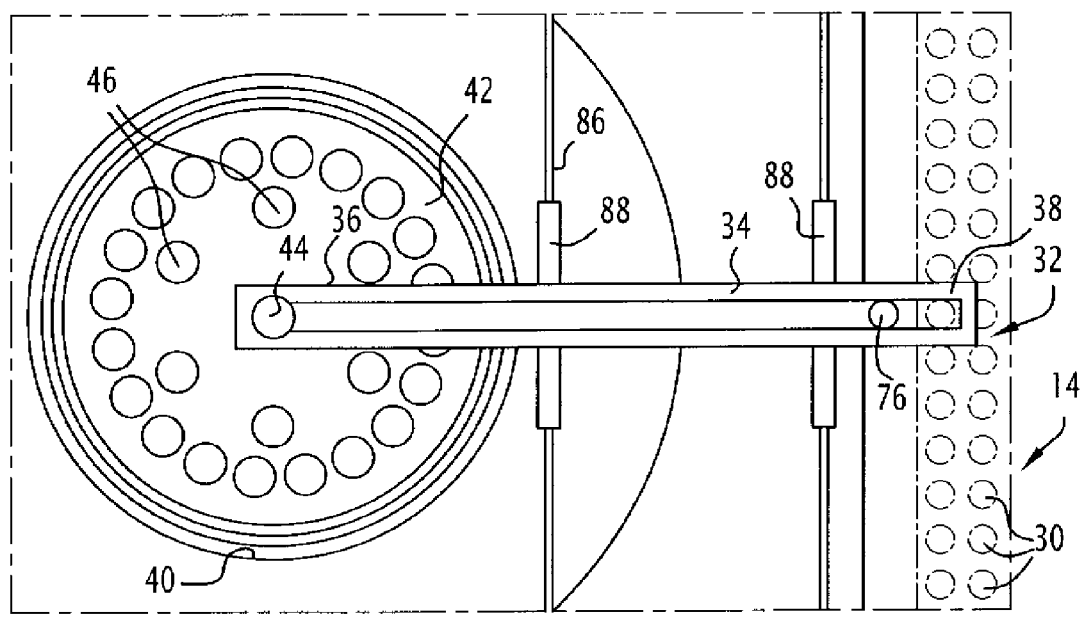
FIG. 2 is an enlarged illustration, viewed from above, of a portion of the biological protection slab of the reactor building of the power station of FIG. 1, for a first embodiment of the invention in which the power station comprises a tunnel for transferring the fuel elements between a reactor and its storage installation, the tunnel being movable from one reactor to another.
Figure 3:
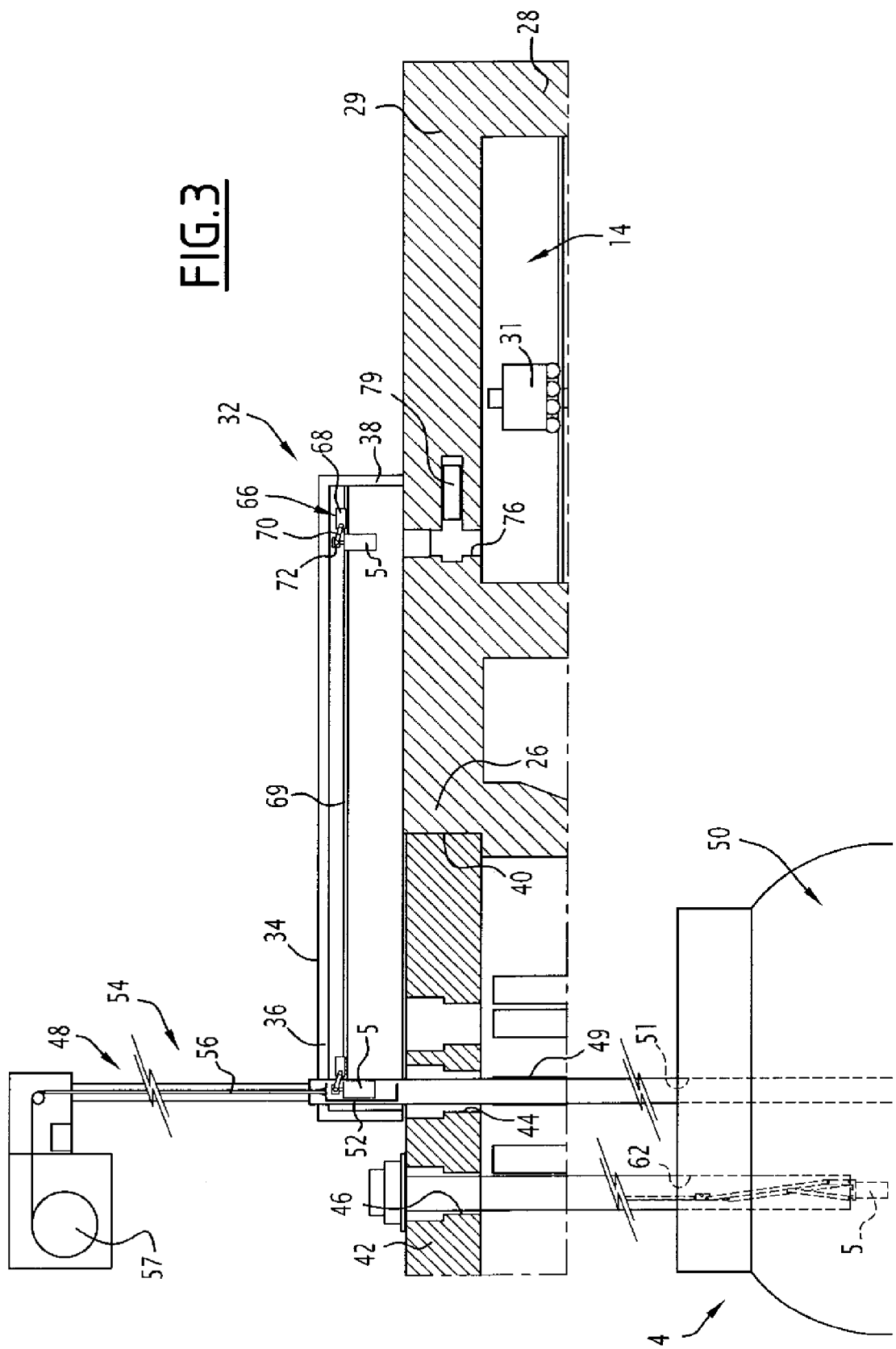
FIG. 3 is a view in vertical cross-portion of the tunnel of FIG. 2, together with the upper portions of a reactor and the corresponding storage installation.

In a first embodiment of the invention, illustrated in FIGS. 2 to 4, these means 32 comprise a movable tunnel 34, capable of serving each of the four reactors.

The tunnel 34 is placed above the slabs 26 and 29 forming the floor of the principal hall of the reactor. The tunnel 34 is rectilinear. Its walls are shielded and are made up of steel and/or lead plates.

When the fuel elements are to be transferred to or from a reactor, the tunnel 34 is placed in such a way that a first end portion 36 of the tunnel is situated above the reactor core, and a second end portion 38 opposite the first is situated above the corresponding storage installation.

As shown in FIG. 3, the biological protection slab 26 comprises perpendicular to the reactor core 4, a circular aperture 40. During normal operation of the reactor, the aperture 40 is closed by a stopper.

The stopper is solid, the control bars being arranged in crossing points situated beneath this stopper.

When maintenance operations or operations to reload the reactor with fuel are required, a support stopper 42, visible in FIG. 3 for example, is placed in the aperture 40 in place of the stopper used for normal operation. The stopper 42 comprises at the centre thereof an opening 44 for the passage of a mechanism for lifting/lowering the fuel elements, and six openings 46 for the passage of the mechanism for handling the fuel elements. The openings 46 are arranged in a circle around the central opening 44 and are distributed regularly around it. It should be noted that some control bars are removed in order to use the crossing points thereof for the passage of the handling mechanism.

As shown in FIG. 2, the first end portion 36 of the tunnel covers the opening 44, the tunnel passing between two of the openings 46.

The end 36 of the tunnel is coupled in a sealed manner around the opening 44, for example by an inflatable joint not illustrated, and communicates with the opening 44.

As shown in FIG. 3, the lifting/lowering mechanism 48 typically comprises a tube 49 extending from the opening 44 downwards and penetrating the reactor vessel 50 by an aperture 51 in the cover of the vessel.

The mechanism 48 also comprises a boat 52 which can move vertically inside the tube 49. The mechanism 48 also comprises means 54 for moving the boat 52 between a high position in which the boat is situated inside the first end 36 of the tunnel, and a low position in which the boat is located inside the reactor vessel 50, immediately above the fuel elements. For example, the means 54 comprise a cable 56 from which the boat 52 is suspended, and means for winding and unwinding the cable 56 around a drum 57.

Figure 5:
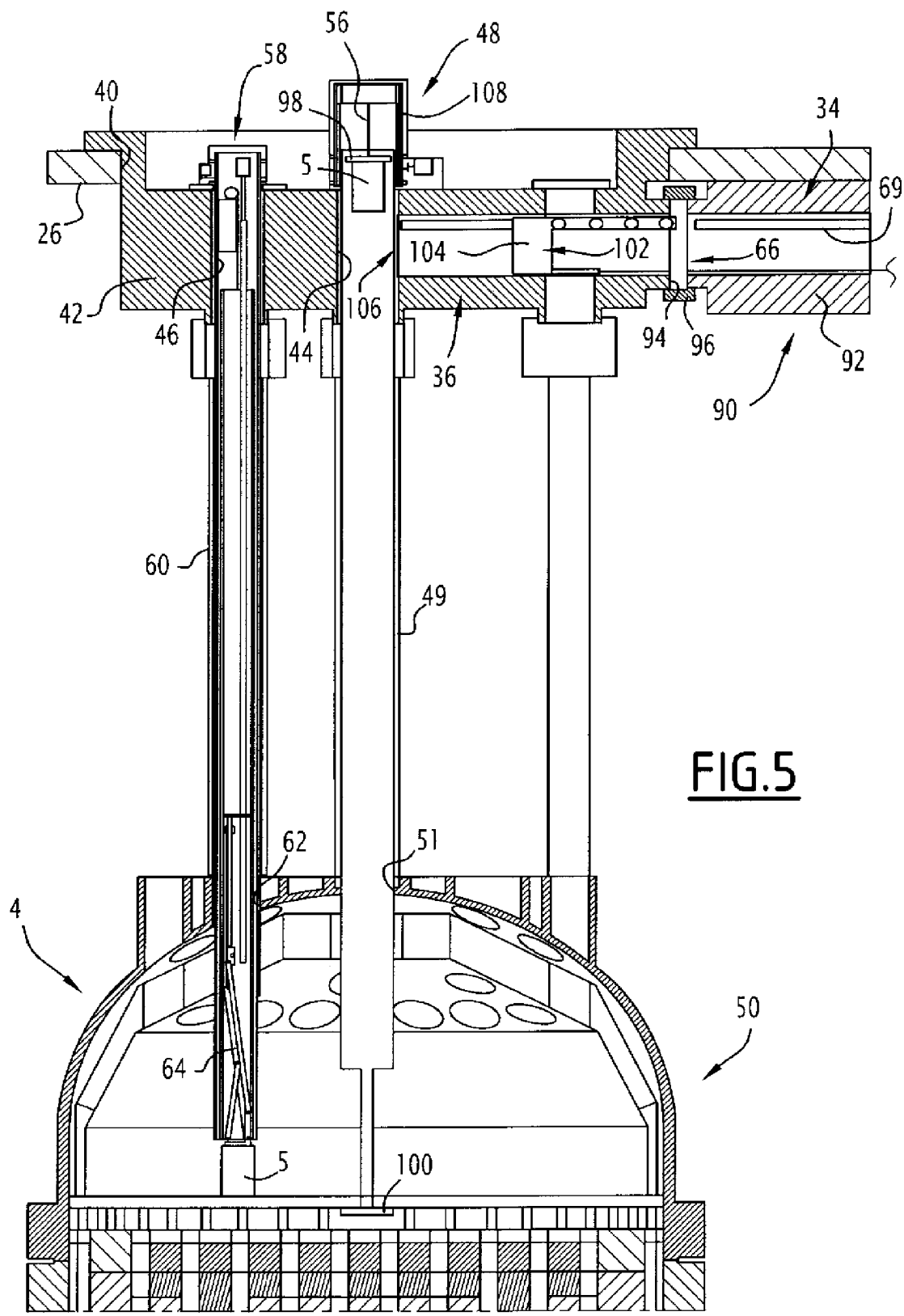
FIG. 5 is a view in cross-portion of the reactor core and one end of a tunnel according to a second embodiment of the invention.

The mechanism 58 for handling the fuel elements is illustrated in a simplified manner in FIG. 3 and in a detailed manner in FIG. 5. This mechanism typically comprises a tube 60 extending from an aperture 46 downwards and penetrating inside the vessel 50 by an aperture 62.

The mechanism 58 also comprises a pantograph-type arm 64, known per se, provided with grasping means, suitable for seizing a fuel element 5 from the core. The arm 64 has a large enough degree of freedom to reach all the fuel elements situated in an angular segment of the core corresponding substantially to ⅙ of the circumference of said core. The arm 64 is in also suitable for transferring each block of this segment to the boat 52, in order to lift said block into the tunnel 34.

The mechanism 58 can move from one opening 46 to another. When it is mounted in an opening 46, it allows ⅙ of the core to be loaded or unloaded. The six openings 46 thus allow access to all of the fuel elements in the core. The mechanism 58 is known and will not be described in more detail.

The means 32 for transferring fuel elements also comprise means 66 for transferring the fuel elements along the tunnel between the first and second portions.

The means 66 comprise for example a carriage 68 capable of moving in rails 69 along the tunnel, a lifting arm 70 mounted on the carriage 68, the arm being provided with means 72 for grasping fuel elements. The means 66 also comprise means for propelling the carriage 68 along the tunnel (not illustrated).

The rails 69 are for example arranged in the upper portion of the tunnel 34. The carriage 68 rolls in the rails by means for example of 2 or 3 pairs of rollers. The means for moving the carriage along the tunnel comprise for example a drag chain.

The arm 70 is mounted on the carriage 68 and has a degree of vertical freedom. Thus, the arm 70 is capable of seizing, by means of grasping means 72, a fuel element 5 arranged in the boat 52, and moving it upwards. The lower portion of the fuel element is then released from the boat, and the fuel element can then move freely along the tunnel.

As shown in FIGS. 3 and 4, the transfer means 32 also comprise means 74 for transferring the fuel element 5 between the end 38 of the tunnel and the interior of the storage installation associated with the reactor. These means 74 comprise a hole 76 provided in the slab 29 and an elevator 78 arranged inside the storage installation. The hole 76 is arranged beneath the end 38 of the tunnel, immediately above the elevator 78, and communicates with the end 38.

It is capable of being sealed by a shielded shutter 79. The elevator 78 comprises a support 80 and telescopic means 82 for moving the support 80 between a high position in which the support 80 is situated at the end 38 of the tunnel and a low position in which the support 80 is located on the loading face 84 of the pits 30. In the high position of the support 80, the arm 70 is suitable for laying down a fuel element on the support or seizing a fuel element arranged on the support 80.

The loading face 84 corresponds substantially to the height of the pit 30. When the support 80 is in the low position, the bridge 31 is able to seize the fuel element arranged on the support 80 and move it to introduce it in one of the storage pits 30.

As indicated above, the tunnel 34 is coupled in a sealed manner around the opening 44 on the one hand and around the aperture 76 on the other hand, for example by inflatable joints.

It is therefore possible to maintain an inert atmosphere along the entire passage path of the fuel elements, in the core, in the tunnel 34 and inside the storage installation.

In order to be able to move the tunnel 34 from one reactor to another, rails 86 are provided on the floor of the principal hall of the nuclear power station (FIGS. 1 and 2). The tunnel is mounted on carriages 88 that can move in the rails 86. The rails 86 extend parallel to the alignment of the reactors and the storage installations.

A second embodiment in which the transfer tunnel between the core of each reactor and the corresponding storage installation is not movable but fixed, will now be described, with reference to FIG. 6.

Only the points by which the second embodiment differs from the first will be detailed below. Like elements or elements performing the same functions will be designated by like reference numerals.

In the second embodiment, each reactor comprises a dedicated tunnel 90, allowing fuel elements to be transferred between the reactor core and the corresponding storage installation. The tunnel 90 extends beneath the biological protection slabs 26 and 29.

In this embodiment, the first end 36 of the tunnel is arranged in the thickness of the support stopper 42. However, the central portion 92 of the tunnel is fixed rigidly beneath the slab 26 and the slab 29. When the stopper 42 is in place in the aperture 40, the end 36 of the tunnel is placed in the extension of the central portion 92. The portion 36 is separated from the portion 92 by a narrow interstice 94. An inflatable joint 96 is provided to provide a seal between the portion 36 and the portion 92 in the region of the interstice 94.

The means 48 for lifting and lowering the fuel elements 5 in the reactor core comprise in place of the boat 52 a grab 98 suspended from the cable 56. In addition, the tube 49 comprises at the lower end thereof a platform 100 on which the pantograph arms 64 are able to lay down or seize a fuel element. The platform 100 is placed vertical to the grab 98, in such a way that the grab is able either to lay down a fuel element 5 on the platform 100, or seize a fuel element which has been placed there by the pantograph arm 64.

The means 66 for moving the fuel element along the tunnel from one end to the other comprise a carriage 102 moving along the tunnel in the rails 69, the carriage 102 being provided with a basket 104. The basket 104 defines inside it a housing that matches the shape of the fuel element to be transported. The tube 49 comprises a window 106 through which the basket can be introduced inside the tube 49. In addition, the tube 49 is extended above the support stopper 42 by an appendage 108 in which the grab 98 and the fuel element coupled thereto can be housed, as illustrated in FIG. 5.

The carriage 102 has four rollers engaged in each rail, which allows it to cross the interstice 94 without loss of stability. The carriage 102 moves along the tunnel by a drag chain not illustrated.

At the end 38 thereof, the tunnel penetrates directly into the storage installation through the side walls 28. In this installation, a fuel element can be removed from the basket 104 or laid down in the basket 104, either by the bridge 34 if the tunnel is arranged at an elevation such that it opens for example in the region of the loading face 84, or by dedicated handling means if the tunnel opens higher up.

According to a second aspect of the invention independent of the first, illustrated in FIG. 1, the different storage installations are connected to each other by connection tunnels 110. Thus, the storage installations 14 and 16 are connected by a tunnel 110, the storage installations 16 and 18 are connected by another tunnel 110, the storage installations 18 and 20 are connected by a third tunnel 110, the storage installation 20 being connected to the new fuel storage installation 22 by a fourth tunnel 110 which passes through the packing installation 24.

These tunnels are of the fixed type, and are therefore arranged typically beneath the biological protection slabs 29. The fuel elements circulate in these tunnels in carriages of the same type as carriage 102 propelled by drag chains. The tunnels 110 open directly into the stores 14, 16, 18, 20 and 22. The tunnels are placed at lower elevations than those of the slabs 29, preferably at elevations such that the fuel elements can be placed in the baskets of the carriages by the bridges 34 equipping the storage installations.

The procedures for loading and unloading the reactor core according to a first embodiment of the invention will now be described.

After shutting down the reactor, the stopper used in normal operation of the reactor is removed from the aperture 40, and the support stopper 42 is put in place. The tunnel 34 then moves along the rails 86 and is placed in such a way that the first end thereof is situated perpendicular to the opening 44 and the second end thereof perpendicular to the hole 76 of the corresponding storage installation. The tunnel 34 and the aperture 44 are then sealed, as are the tunnel 34 and the hole 76. If necessary, the equipment impeding access to the penetration apertures 51 and 62 into the core are dismantled. This equipment may be instrumentation means for the central aperture 51, and control bars for the apertures 62.

Next, the means 48 for lifting and lowering the fuel elements and the means 58 for handling the fuel elements are placed on the stopper 42. The loading operation of some of the fuel elements of the core may then begin. Typically, half the fuel elements of the core are replaced with new fuel elements at each campaign. Such a replacement campaign is carried out every 1 to 2 years.

Handling is carried out successively on each ⅙ of the core. One ⅙ of the reactor core is emptied into the associated storage installation. Elements at the end of their life are removed (one half) and elements that are not yet spent are retained. New elements are added to the elements that are not yet spent. One ⅙ of the core is then stacked according to the arrangement required (mixture of new elements and elements that are not yet spent). Once handling has been carried out on ⅙ of the core, the operation moves to another zone of the core. The handling means 58 are mounted on another aperture 46. The operation is repeated six times in total at each campaign, all the fuel elements in the core being emptied and half being put back in place. The other half is made up of new elements.

To remove the fuel elements, the boat 52 is first lowered in the region of the core. During this time, the pantograph arm 64 seizes a fuel element to be removed. It lays it down in the boat 52 once said boat has reached its low position. The boat then rises to the high position. The arm 70 seizes the fuel element loaded in the boat 52 when said boat is in the high position. Next, the carriage 68 moves along the tunnel 34 to the end 38 thereof. Once the carriage has stopped, the elevator 78 searches for the fuel element 5 and lowers it inside the storage installation through the hole 76. When the elevator 78 has lowered the fuel element in the region of the loading face

84 of the pits, the bridge 31 takes hold of the fuel element again and inserts it in one of the pits. Next, the carriage goes back to the first end of the tunnel to search for another fuel element brought by the boat 52.

It should be noted that the different handling means transferring the fuel elements from the core to the storage installation may work in parallel with each other.

Thus, the carriage may perform its outward and return journeys along the tunnel while the elevator and the storage installation bridge transfer the fuel element into a pit.

Similarly, the boat 52 may be lowered, receive a fuel element and lift it while the carriage 68 moves the previous fuel element from the first end 36 to the second end 38, the arm 70 lays it down on the elevator 78 and the carriage 68 returns to the first end. The pantograph arm may seize a new fuel element, position it in the boat 52 and go back to seize another fuel element while the carriage does an outward and return journey along the tunnel.

These different tasks are therefore carried out at the same time, such that the time needed to remove one sixth of the fuel elements from the reactor core to the storage installation is shortened considerably compared with the state of the art using a hood.

Once the transfer of the fuel elements is complete, the fuel elements at the end of their life are removed outside the nuclear power station or to the storage installation 20. New fuel elements are brought from the installation 22 to the storage installation associated with the reactor to be loaded. Next, the elements that are not yet spent and the new elements are loaded in the reactor core.

Accordingly, a fuel element to be loaded is seized by the bridge and placed in the elevator support 80. The elevator raises the fuel element to the end 38 of the tunnel, where said fuel element is seized by the arm 70 mounted on the carriage. The carriage then moves the fuel element to the first end of the tunnel, while the elevator is lowered back down in the region of the loading face of the storage installation.

The arm 70 lays down the fuel element in the boat 52. The carriage then returns to the second end to search for another fuel element. During this time, the boat 52 lowers the fuel element inside the reactor core. When the boat is in the low position, the pantograph arm seizes the fuel element and lays it down in the required place in the reactor core.

In the same way as for the unloading, the different elements for handling the fuel elements work at the same time to load the reactor.

The loading and unloading procedure for the second embodiment of the invention is substantially similar to the procedure described above with reference to the first embodiment. Only the operation of the lifting and lowering means of the fuel elements in the reactor core will be described below.

To remove the spent fuel elements from the reactor core, the pantograph arm 64 first seizes a fuel element from the reactor core and places it on the tray 100 situated beneath the grab 98. The grab is lowered, seizes the fuel element placed on the tray 100 and lifts it to the protuberance 108. The carriage 102 then moves to engage the basket 104 inside the tube 49, which allows it to be placed beneath the fuel element held by the grab. The grab then lays down the fuel element inside the basket 104 and is uncoupled from said fuel element. The carriage then moves to the second end of the tunnel, and the fuel element is removed from the basket by the handling means provided for this purpose.

As previously, here too the different handling means for the fuel elements work at the same time.

The nuclear power station described above has many advantages.

Because the transfer means between the core of each reactor and the corresponding storage installation comprise:
a tunnel, of which a first portion is situated near the core and a second portion is situated in or near the storage installation;
first transfer means suitable for transferring at least one fuel element between the core and the first stretch;
second transfer means suitable for transferring at least one fuel element between the second portion and the storage installation; and
means for transferring at least one fuel element along the tunnel between the first and second portions, the time required to remove the spent fuel elements from the core to the storage installation, or conversely to transfer the new fuel elements from the storage installation to the reactor core, is considerable reduced since the different means participating in the transfer of the fuel elements can work in parallel and operate at the same time.

The tunnel, the connection means between this tunnel and the core on the one hand, and the connection means between the tunnel and the storage installation on the other hand, form a continuous path from the core to the storage installation. It is thus possible to transfer the fuel elements under an inert atmosphere from the core to the storage installation without breaking containment.

Along this path, the tunnel and the connection means provide continuous biological protection to the operators.

Moreover, the transfer of the fuel elements between the core and the storage installation is carried out without heavy and bulky objects, such as a hood, needing to be moved by a rolling bridge equipping the hall of the reactor. There is therefore no risk of the load falling during transfer.

Moreover, this frees the reactor bridge, which can be used to carry out other tasks.

The means employed to carry out the transfer are simple and inexpensive.

The nuclear power station described above may have many variants.

It may comprise only one high temperature reactor or any number of reactors.

The tunnel may be rectilinear or not rectilinear.

The same tunnel, in a given position, may serve a plurality of storage installations from the same reactor. In this case, the tunnel passes above a plurality of holes allowing fuel elements to be lowered into different storage installations.

Conversely, the same tunnel may, in a given position, serve a single storage installation from a plurality of reactors.

It is possible to envisage all sorts of transfer means between the reactor core and one end of the tunnel. These means may be a grab, a boat suspended from a cable, an elevator, or any other type of transfer means.

Similarly, the transfer means between the storage installation and the tunnel may be of any type: grab, basket suspended from a cable, elevator, etc.

These transfer means can be adapted equally well to a fixed tunnel arranged beneath the biological protection slabs or alternatively to a movable tunnel arranged beneath the biological protection slab.

The means for transferring fuel elements along the tunnel may also be of any type. They may comprise a carriage provided with a grasping arm or a basket, or alternatively a cradle for receiving the fuel element. The fuel elements may be transferred upright or lying down, etc.

The means for driving the carriage along the tunnel may also be of any type: drag chains, rack and pinion assembly, etc.

In the case of a fixed tunnel arranged beneath the biological protection slabs, the end of the tunnel on the reactor side may be arranged not in the support stopper situated above the core, but beneath said support stopper.

The nuclear power station may comprise all sorts of means for handling the fuel elements in the reactor vessel. These means may be a pantograph arm as described above, or for example a robotised arm having a plurality of degrees of freedom, or any other type of grasping means.

The support stopper situated above the core may not comprise a single opening for removing the fuel elements and transferring them to the tunnel. The stopper may comprise a plurality of openings arranged at different places.

Similarly, the storage installation may have different apertures allowing the fuel elements to be transferred between the interior of the storage installation and the tunnel.

Each reactor may comprise a steam generator in place of the principal heat exchanger.

Alternatively the primary fluid may drive directly a gas turbine coupled to an electric generator.

The invention has been described for an embodiment in which the fuel elements are hexagonal, 900 mm high and with a cross-portion that lies within a circle of 450 mm diameter. It applies to fuel elements with all sorts of square, circular or other cross-portions. These elements may be of a greater or lesser height than 900 mm, the cross-portion thereof lying within a circle of any diameter, larger or smaller than 450 mm.

In a variant, the connection tunnels between the storage installations may extend above the slab 29. It is then necessary to provide in the connection tunnels and stores handling means suitable for transferring the fuel elements between the ends of the tunnels and the stores. These means may be for example of the same type as the elevator 78 described in relation to the first embodiment of the invention.

The storage installations are not necessarily arranged in line. They may for example be laid out in a star around the installation with the greatest capacity 20, the connection tunnels radiating from the installation 20.

The invention claimed is:

1. Nuclear power station comprising:
   a plurality of high temperature reactors (2), each comprising a core (4) in which a plurality of fuel elements (5) are arranged;
   for each reactor (2), a dedicated storage installation (14, 16, 18, 20, 22) for the fuel elements (5) for said reactor (2);
   means (32) for transferring the fuel elements (5) between the core (4) and the storage installation (14, 16, 18, 20, 22);
   wherein the transfer means (32) comprise:
   a tunnel (34), of which a first portion (36) is situated near the core (4) and a second portion (38) is situated in or near the storage installation (14, 16, 18, 20, 22);
   first transfer means (48, 58) suitable for transferring at least one fuel element (5) between the core (4) and the first portion (36);
   second transfer means (78) suitable for transferring at least one fuel element (5) between the second portion and the storage installation (14, 16, 18, 20, 22);
   means (66) for transferring at least one fuel element (5) along the tunnel (34) between the first and second portions (36, 38); and
   means (86, 88) for moving the tunnel (34) between a plurality of service positions each corresponding to one of the reactors (2), the first portion (36) of the tunnel (34) being situated in each service position near the core of the corresponding reactor and the second portion (38) of the tunnel (34) being situated in or near the dedicated storage installation (14, 16, 18, 20) for said reactor (2).

2. Nuclear power station according to claim 1, wherein the first portion (36) is situated above the core (4).

3. Nuclear power station according to claim 1, wherein the first transfer means (48, 58) comprise first connection means substantially sealed between the core (4) and the first portion (36), the second transfer means (78) comprise second connection means (74) substantially sealed between the second portion (38) and the storage installation (14, 16, 18, 20, 22), the tunnel (34) forming with the first and second connection means a continuous sealed path for the fuel elements (5) from the core (4) to the storage installation (14, 16, 18, 20, 22).

4. Nuclear power station according to claim 1, wherein it comprises a first biological protection slab (26) situated above the reactor core (4), the tunnel (34) being arranged at least in part beneath or in the first biological protection slab (26).

5. Nuclear power station according to claim 4, wherein the first biological protection slab (26) comprises an aperture (40) perpendicular to the core (4), the power station comprising a support stopper (42) arranged removably in the aperture (40), the first portion (36) of the tunnel (34) being arranged in the support stopper (42).

6. Nuclear power station according to claim 4, wherein it comprises a second biological protection slab (29) situated above the storage installation (14, 16, 18, 20, 22), the second portion (38) of the tunnel (34) being situated at a lower elevation than that of the second biological protection slab (29).

7. Nuclear power station according claim 1, wherein it comprises a first biological protection slab (26) situated above the reactor core (4), the tunnel (34) being arranged at least in part above the first biological protection slab (26).

8. Nuclear power station according to claim 7, wherein the first biological protection slab (26) comprises an aperture (40) perpendicular to the core (4), the power station comprising a support stopper (42) arranged removably in the aperture (40), the first portion (36) of the tunnel (34) being arranged above the support stopper (42).

9. Nuclear power station according to claim 7, wherein it comprises a second biological protection slab (29) situated above the storage installation (14, 16, 18, 20, 22), the second portion (38) of the tunnel (34) being situated above the second biological protection slab (29).

10. Nuclear power station according to claim 1, wherein it comprises:
    a plurality of connection tunnels (110) connecting each two storage installation (14, 16, 18, 20) to each other, each connection tunnel (110) comprising a first portion situated near one of the two corresponding storage installations (14, 16, 18, 20) and a second portion situated in or near the other of the two corresponding storage installations (14, 16, 18, 20);
    for each connection tunnel (110), first transfer means suitable for transferring at least one fuel element (5) between the corresponding storage installation (14, 16, 18, 20) and the first portion;
    for each connection tunnel (110), second transfer means suitable for transferring at least one fuel element (5) between the second portion and the corresponding storage installation (14, 16, 18, 20);
    for each connection tunnel (110), means for transferring at least one fuel element (5) along the connection tunnel (110) between the first and second portions.

11. Nuclear power station according to claim 10, wherein it comprises a biological protection slab (29) situated above each storage installation (14, 16, 18, 20), the first and second portions of each connection tunnel (110) being situated at respective elevations lower than those of the biological protection slabs (29) of the corresponding storage installations (14, 16, 18, 20).

12. Nuclear power station according to claim 10, wherein the storage installations (14, 16, 18, 20) are arranged in a line, each connection tunnel (110) connecting two adjacent storage installations (14, 16, 18, 20) along the line.

13. Nuclear power station according to claim 1, wherein the core contains a given number of fuel elements, the storage installation having a storage capacity of at least one sixth of said given number of fuel elements.

* * * * *